US006260757B1

(12) United States Patent
Strisower

(10) Patent No.: US 6,260,757 B1
(45) Date of Patent: *Jul. 17, 2001

(54) AUTOMATIC CASHIER MACHINE

(76) Inventor: John M. Strisower, 376 Brookside Dr., Chico, CA (US) 95928

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/962,025

(22) Filed: Oct. 31, 1997

(51) Int. Cl.[7] ...................................................... G06F 17/60

(52) U.S. Cl. .......................... 235/379; 235/381; 348/150; 194/205

(58) Field of Search .................................... 235/379, 375, 235/381, 383; 348/150; 340/825.35; 364/479.01, 479.02, 479.06; 382/136; 194/205, 210, 211, 212; 273/138.1

(56) References Cited

U.S. PATENT DOCUMENTS 3,124,674 3/1964 Edward et al. .
4,373,726 2/1983 Churchill et al. .
4,494,197 1/1985 Troy et al. .
4,575,622 3/1986 Pellegrini .
4,755,941 7/1988 Bacchi .
4,814,589 3/1989 Storch et al. .
4,882,473 11/1989 Bergeron et al. .
4,942,464 * 7/1990 Milatz ................................. 348/150
4,991,008 * 2/1991 Nama .................................. 348/150
5,038,022 8/1991 Lucero .
5,083,271 1/1992 Thacher et al. .
5,103,081 4/1992 Fisher et al. .
5,110,134 5/1992 Laughlin et al. .
5,159,549 10/1992 Hallman, Jr. et al. .
5,166,502 11/1992 Rendleman et al. .
5,179,517 1/1993 Sarbin et al. .
5,249,800 10/1993 Hilgendorf et al. .
5,283,422 2/1994 Storch et al. .
5,287,269 2/1994 Dorrough et al. .
5,321,241 6/1994 Craine .
5,362,053 11/1994 Miller .
5,364,106 11/1994 Laughlin et al. .
5,371,345 12/1994 LeStrange et al. .
5,397,133 3/1995 Penzias .
5,470,079 11/1995 LeStrange et al. .
5,477,952 12/1995 Castellano et al. .
5,613,912 3/1997 Slater .

FOREIGN PATENT DOCUMENTS 3807127 9/1989 (DE) .
4212760 * 9/1993 (DE) .................................... 235/379
9221413 12/1992 (WO) .
9607153 3/1996 (WO) .
9706865 2/1997 (WO) .

OTHER PUBLICATIONS

M. Enbysk, "Rolling Out the Coins," Washington CEO Network, 5 pages (World Wide Web 1996).
"Introducing the Next Logical Step in Player Tracking," PitTrack™ Player Tracking System, PRC Gaming Systems, 8 pages (Feb. 1995).
"Coin Machines a Refreshing Change," The Roanoke Times, Metro Edition, pp. 1–2 (Mar. 13, 1994).

(List continued on next page.)

*Primary Examiner*—F. L. Evans
(74) *Attorney, Agent, or Firm*—Blakely, Sokoloff, Taylor & Zafman LLP

(57) ABSTRACT

An apparatus for receiving tokens and dispensing cash. A recognition device recognizes a denomination of a token and a source of a token, wherein the token is not government-issued legal tender. A controller device is coupled to the recognition device. The controller device comprises a calculating device that calculates the monetary value of the token. A dispensing device is coupled to the recognition device. The dispensing device dispenses cash equal in value to the monetary value of the token.

46 Claims, 9 Drawing Sheets

OTHER PUBLICATIONS

"Money Comes Out of Piggy Banks at Record Pace," Coinstar Web page, 2 pages (1997).

"Introducing the Next Logical Step in Player Tracking," PitTrack™, PRC Gaming Systems, International Gaming and Wagering Business (Oct. 1994).

* cited by examiner

AUTOMATIC CASHIER MACHINE

FIELD OF THE INVENTION

The present invention relates to the field of coin or token operated machines. More particularly, the present invention relates to machines that receive tokens or chips and dispense cash in exchange.

BACKGROUND OF THE INVENTION

Machines currently exist that allow a user to insert bills and receive coins in exchange. In addition, Coinstar, Inc. of Bellevue, Wash. makes a machine that allows users to convert large amounts of coins to bills without going to a bank. The Coinstar machine receives change and dispenses vouchers that users may take to a cashier and exchange for bills and change. A user of the Coinstar machine is charged a percentage of the transaction total for the service of converting the coins to bills.

Machines also exist that receive money in the form of coins or bills and dispense a product such a food item or postage stamps.

Other machines read a magnetic strip on a plastic card and perform some function upon recognizing the proper information from the magnetic strip. A well known example of such a machine is an automatic teller machine ("ATM"). A user of an ATM has a card encoded with information unique to the user. The information allows the ATM to recognize the user and prompt the user for entry of a secret code. Once the user enters the code on a keypad of the machine, the ATM checks the entered code against the code that is associated with the card. If the information matches, the user can proceed by responding to prompts from the ATM until the transaction is complete. Some possible ATM transactions are withdrawing money from an account, depositing money into an account, or making a payment owed to an account.

In casino gambling, patrons use chips in many of the games instead of money. During play, a user accumulates gambling chips. Gambling chips are not legal tender and are typically negotiable only inside a particular casino. Chips from different casinos sometimes appear to be somewhat similar. For example, chips from different casinos may be of similar materials, sizes and colors, yet not be interchangeable. Currently, gambling patrons cash in their winnings in the form of chips by going to a human cashier. The human cashier counts the chips and returns money to the patron.

Disadvantages are associated with using human cashiers. There is a possibility that a human cashier will make an error in counting the chips and returning cash. A human cashier could also attempt to steal from a patron or an employer in the course of a transaction. It is necessary for a casino to hire enough cashiers to serve the number of patrons who wish to cash in their chips, significantly adding to overhead. Finally, patrons dislike waiting in cashier lines when there are not enough cashiers to service all the patrons promptly.

SUMMARY OF THE INVENTION

One object of the present invention is to provide a method and apparatus for automatically exchanging tokens or gambling chips for cash.

Another object of the present invention is to provide a method and apparatus for exchanging tokens or gambling chips for cash that is less prone to error than a human cashier.

Another object of the present invention is to provide a method and apparatus for exchanging tokens or gambling chips for cash that provides a record of each transaction.

An apparatus for receiving tokens and dispensing cash is described. The apparatus comprises a recognition device that recognizes a denomination of a token and a source of a token wherein the token is not government issued legal tender. A controller device is coupled to the recognition device. The controller device comprises a calculating device that calculates the monetary value of the token. A dispensing device is coupled to the recognition device that dispenses cash equal in value to the monetary value of the token.

Other objects, features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings in which like references indicate similar elements and in which.

DETAILED DESCRIPTION

An apparatus and method is described that allows automatic exchange of tokens or gambling chips for cash and keeps a record of each transaction and user. For one embodiment, a token or gambling chip is recognized by identifying a radio frequency (RF) transmission. For another embodiment, a token or gambling chip is recognized by comparing a closed circuit television (CCTV) image of the token or gambling chip with a database of images. Alternative embodiments allow for the printing and dispensing of a receipt bearing a record of a transaction. Alternative embodiments also allow tokens to be retrieved after a transaction and associated with a patron that conducted the transaction.

Figure 1A:
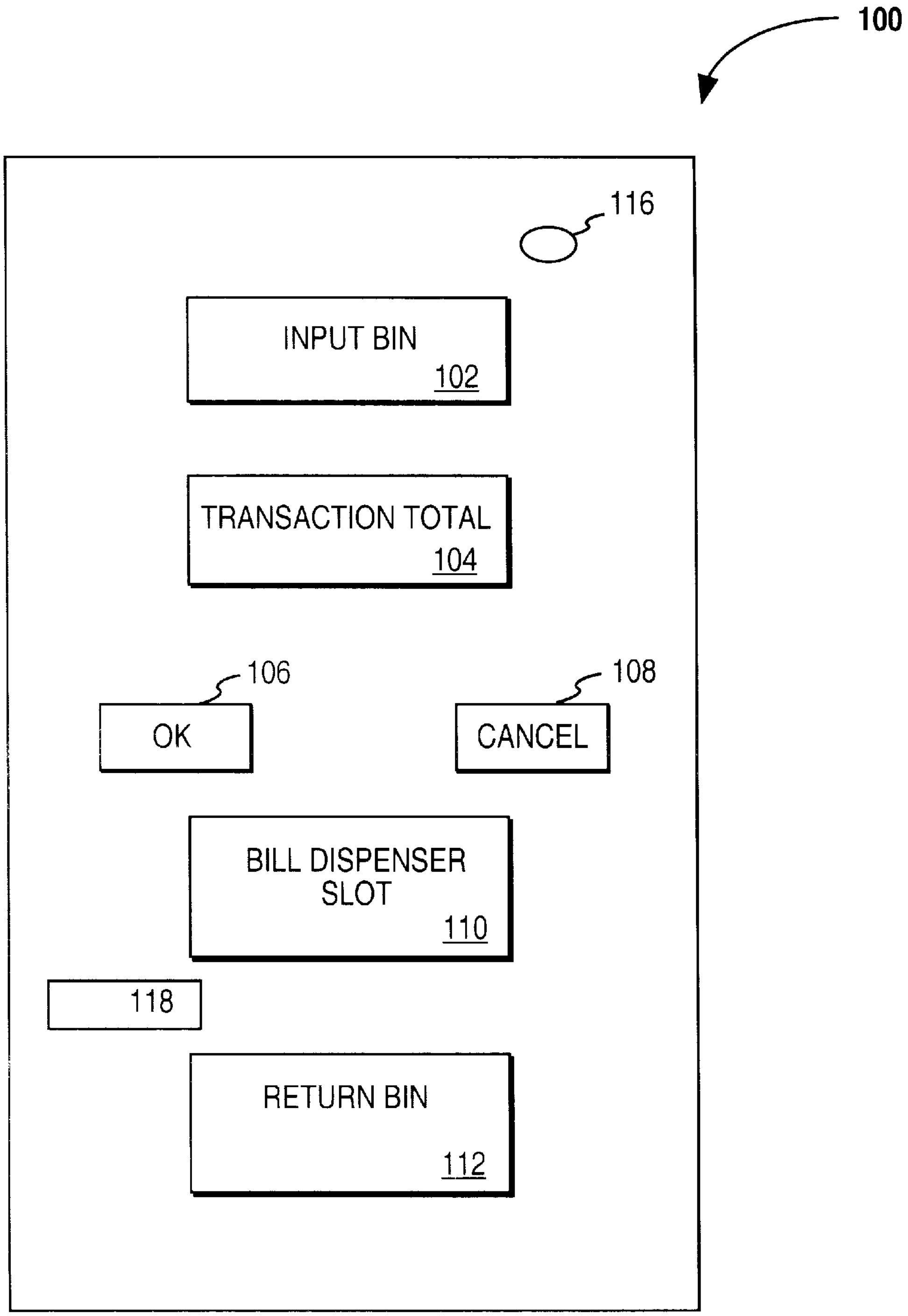
FIG. 1*a* is a front view of an embodiment of the present invention.

FIG. 1*a* is a front view of an embodiment 100 of an automatic cashier machine of the present invention. Tokens or gambling chips are input into input bin 102. Bills are dispensed through bill dispenser slot 110. Tokens or gambling chips that are not acceptable are returned in return bin 112. "Okay" button 106 and "cancel" button 108 allow a user to approve a transaction or cancel a transaction, respectively. Current total transaction value in appropriate units, such as dollars, is displayed on display 104. If a user does not approve of a transaction total, he or she may press cancel button 108 and receive all input tokens or gambling chips for that transaction in return bin 112. At the completion of a transaction, the user receives a printed record of the transaction through receipt printer output 114. For each individual transaction, CCTV camera 116 takes a picture of the user.

Figure 1B:
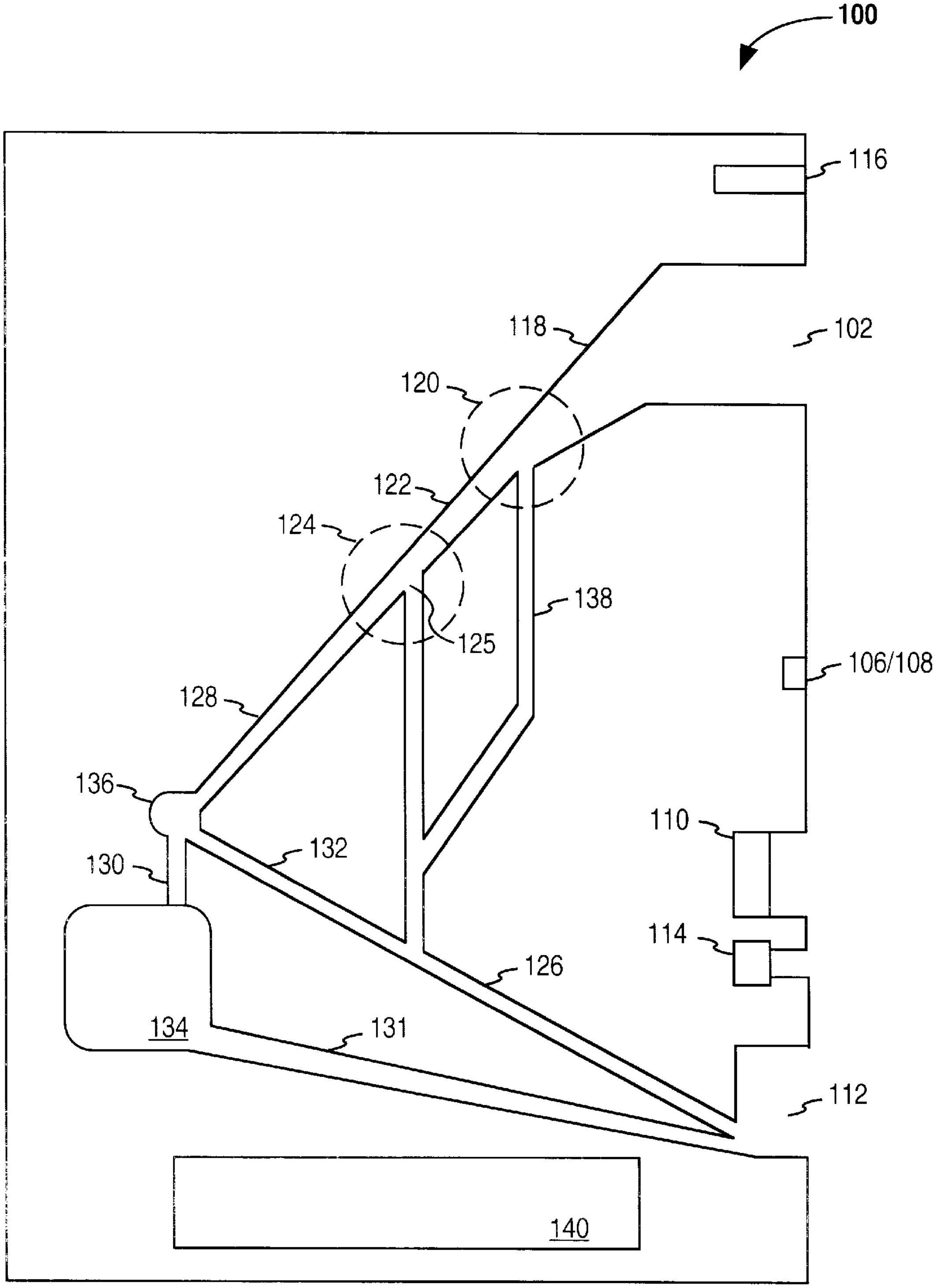
FIG. 1*b* is a cut-away side view of an embodiment of the present invention.

FIG. 1*b* is a cutaway side view of embodiment 100. Items are inserted into input bin 102 by a user. Items can be separated by size into acceptable items and unacceptable items because unacceptable items are known to have a certain size range. After items are inserted into input bin 102 they proceed to funnel 118 and on to first physical separator 120.

Figure 2:
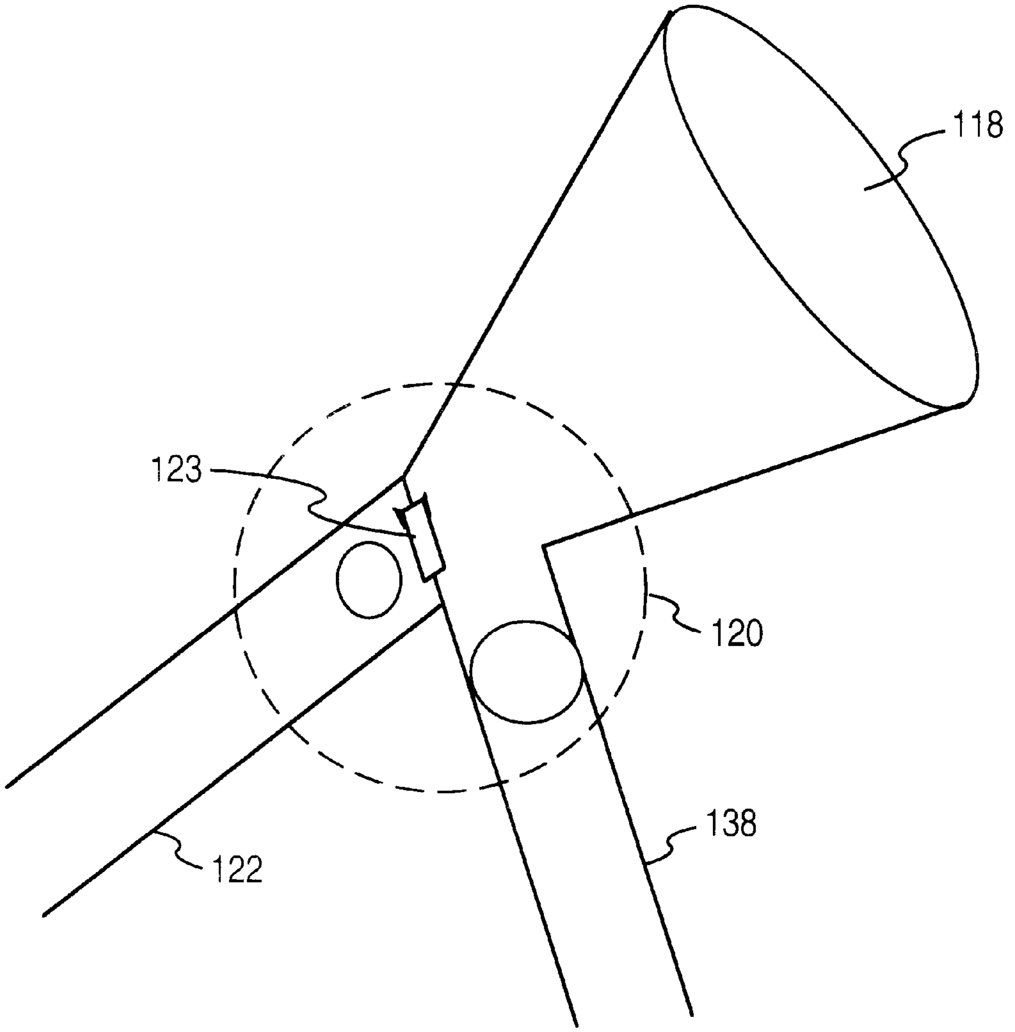
FIG. 2 illustrates an input bin and first physical separator of an embodiment of the present invention.

FIG. 2 is an illustration of first physical separator 120 and funnel 118. Referring to FIG. 2, first physical separator 120 separates out items that are oversize, i.e., items larger than the largest acceptable item. Chute 138 includes slot 123 opening into chute 122. Slot 123 is sized such that items that are not larger than the largest acceptable item will fall through slot 123. Items that are too large to fall through slot 123 fall through to chute 138, and proceed through return chute 126 to return bin 112. Items continuing to chute 122 proceed to second physical separator 124.

Referring again to FIG. 1*b*, second physical separator 124 includes opening 125 to return chute 126. Opening 125 is sized such that any item that is too small to be acceptable will fall from second physical separator 124 through return chute 126 to return bin 112. Items that are not too small to be acceptable proceed to chute 128 and then to identification area 136. In identification area 136, items are scrutinized to determine source and denomination. For one embodiment, items having as a source a particular casino are considered acceptable. If an item is not recognized as having a proper source, the item proceeds to return chute 126 through chute 132 and finally to return bin 112. If an item is recognized as having a proper source, its denomination is recorded by controller 140 and the item proceeds to token reservoir 134. Computer controller 140 is electronically connected to identification area 136, and in one embodiment, contains hardware and software designed to cooperate with a recognition device of identification area 136 (as explained more fully below) to recognize particular items as being acceptable. Computer controller 140 also includes a memory device (not shown) for storing information regarding operation of embodiment 100 and regarding particular transactions and for storing computer programs executed by the computer controller 140 in operating the automatic cashier machine, Display 104 displays a current transaction total. When the user wishes to complete the transaction, the user may accept the transaction by pressing okay button 106. If okay button 106 is pressed, bill dispenser 110 dispenses bills having a total value that equals the current transaction value last displayed on display 104. For one embodiment, a printed receipt bearing a record of the transaction is dispensed through receipt printer output 114. If the user presses cancel button 108 to cancel the transaction, all items inserted during the transaction are returned to return bin 112.

Figure 3:
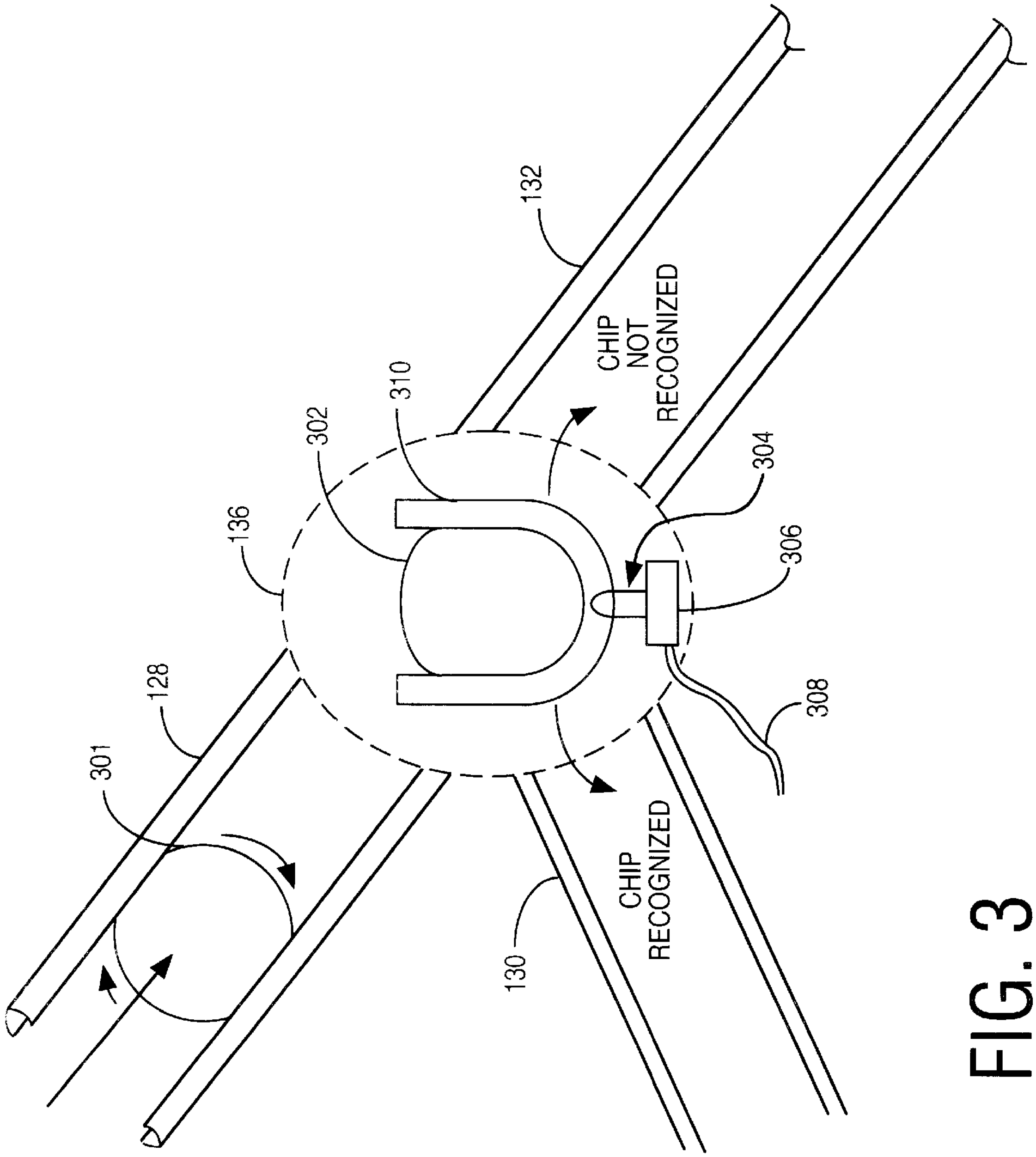
FIG. 3 is a diagram of an arrangement that retains a token while it is being identified.

FIG. 3 is a diagram of an arrangement that retains a token while it is being identified. The arrangement resides in identification area 136 and includes a frame 310 that holds token 302, a solenoid finger 304 and a solenoid 306 that is connected to computer controller 140 through wire 308. Token 301 is shown to illustrate how tokens enter frame 310 from chute 128. While held in frame 310, token 302 is identified according to one of several methods. Two methods of identification are discussed below. If token 302 is identified as acceptable, it is kicked by solenoid finger 304 into chute 130, which leads to token reservoir 134. If token 302 is not recognized as acceptable, it is kicked by solenoid finger 304 into chute 132, which leads to return bin 112.

Figure 4:
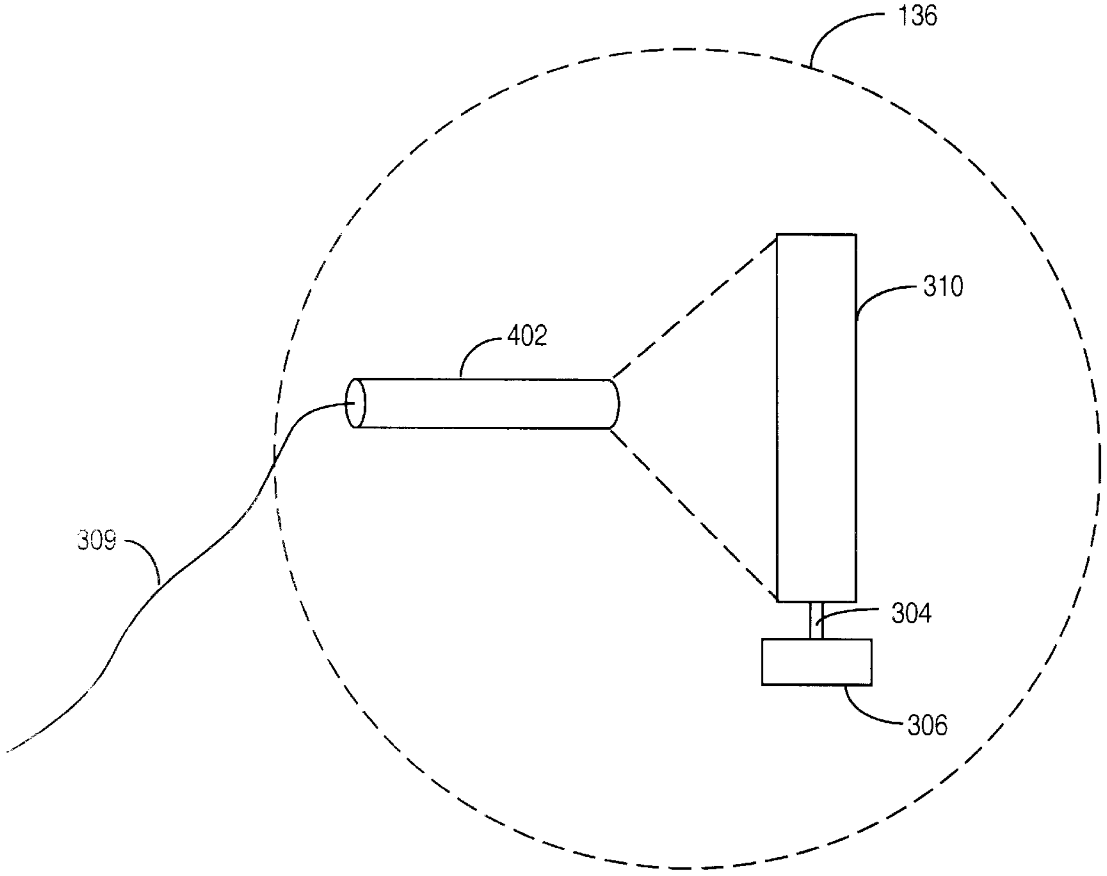
FIG. 4 illustrates an embodiment using a closed circuit television camera to identify a token.

FIG. 4 illustrates a token identification device according to one embodiment. Frame 310 is shown in side view enclosing token 302. Solenoid finger 304 and solenoid 306 are also shown. CCTV camera 402, in this embodiment, resides in identification area 136 and is connected to computer controller 140 through wire 309. Wire 309 is connected, for example, to a video capture input card of computer controller 140. When a token is held in frame 310, CCTV camera 402 transmits an image of the token to computer controller 140 for comparison with images in a database. If the image of the token is not recognized through comparison as the image of an acceptable token, the token is sent to return bin 112 as previously described. If the image of the token is recognized as the image of an acceptable token, the denomination of the token is stored by computer controller 140 and added to a total mount of any previous tokens of the same transaction that were recognized as acceptable.

Figure 5A:
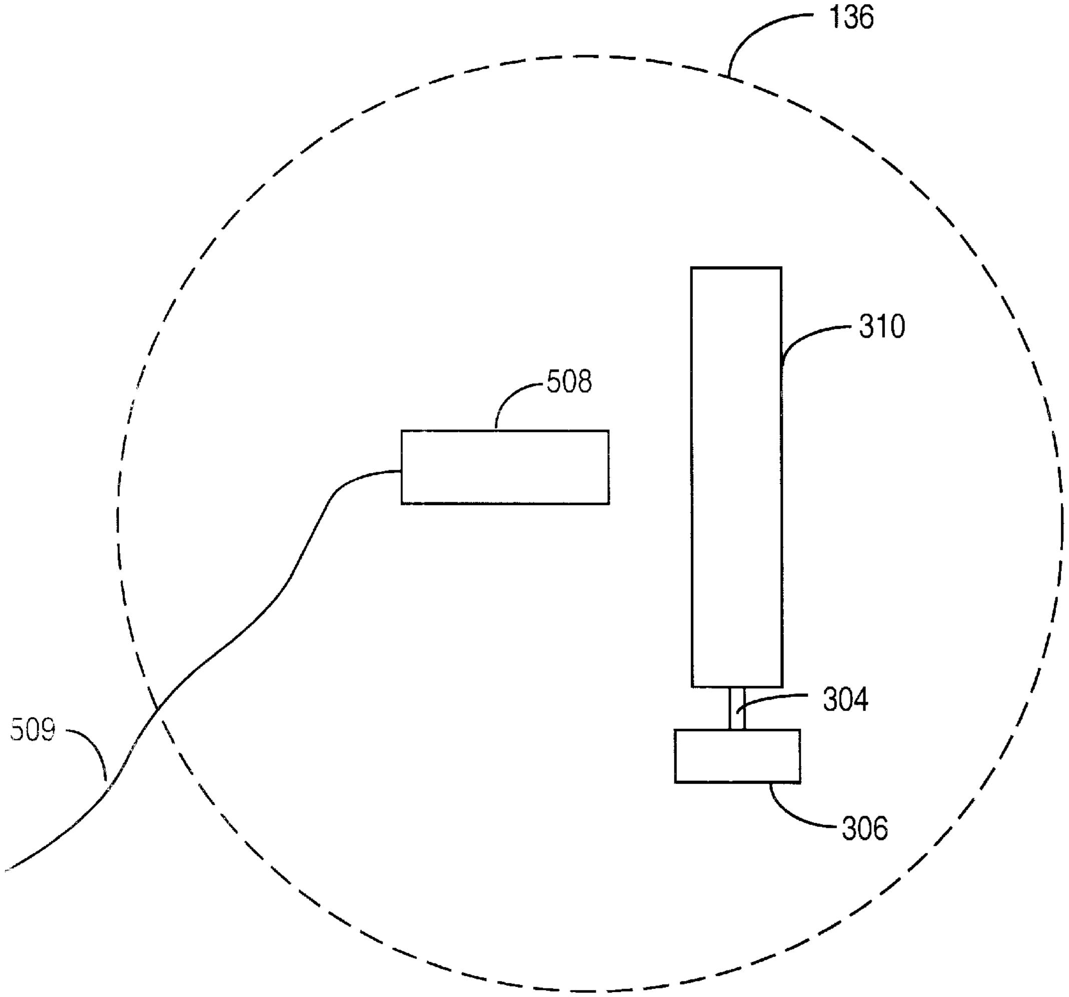
FIG. 5*a* illustrates an embodiment using a closed circuit television camera to identify a token.
Figure 5B:
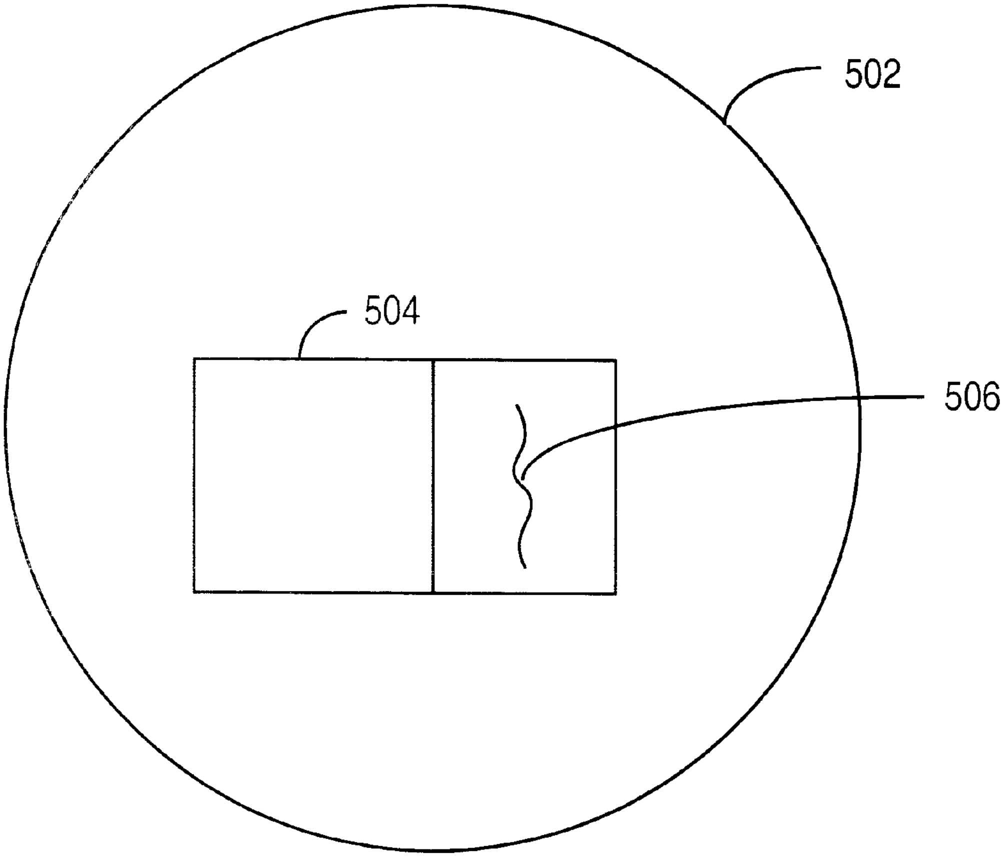
FIG. 5*b* is a diagram of a token used with the embodiment of FIG. 5*a;*

FIG. 5*a* illustrates a token identification device according to another embodiment. FIG. 5*b* illustrates a particular type of token that is required in this embodiment. Referring to FIG. 5*a*, frame 310, solenoid finger 304, and solenoid 306 are shown. Radio frequency (RF) transceiver 508 is shown in identification area 136. RF transceiver 508 is coupled to computer controller 140 through wire 509, which is connected, for example, to a serial port of computer controller 140.

For this embodiment, the token of FIG. 5*b* must be used. Referring to FIG. 5*b*, token 502 is shown in top cutaway view. Embedded in token 502 are semiconductor chip 504 and RF fiber 506. When token 502 is held in frame 310 in the embodiment of FIG. 5*a*, transceiver 508 emits RF radiation in the direction of token 502. The RF radiation induces a current in fiber 506 which is then used by semiconductor chip 504 as a source of power to transmit its own RF radiation. The RF radiation from token 502 is encoded with an identifier including source and denomination information. The RF radiation from token 502 is received by transceiver 508 which passes the encoded information to computer controller 140. Computer controller 140 includes a database of all acceptable codes and their significances. If the encoded information is recognized, the token is recognized as an acceptable token, and the denomination of the token is stored by computer controller 140 and added to a total amount of any previous tokens of the same transaction that were recognized as acceptable.

Tokens or gambling chips such as token 502 are manufactured and sold by ChipCo International of Windham, Me. Semiconductors such as semiconductor 504, which can be embedded in token 503, are manufactured and sold by Micron Technologies of Boise Id. Transceivers such as transceiver 508 are manufactured and sold by Product Enhancement Products (PEP) of Laguna Hills Calif.

In other embodiments, technologies other than RF transmission can be used to identify a token held in frame 310, for example, magnetic ultrasound identification.

Figure 6:
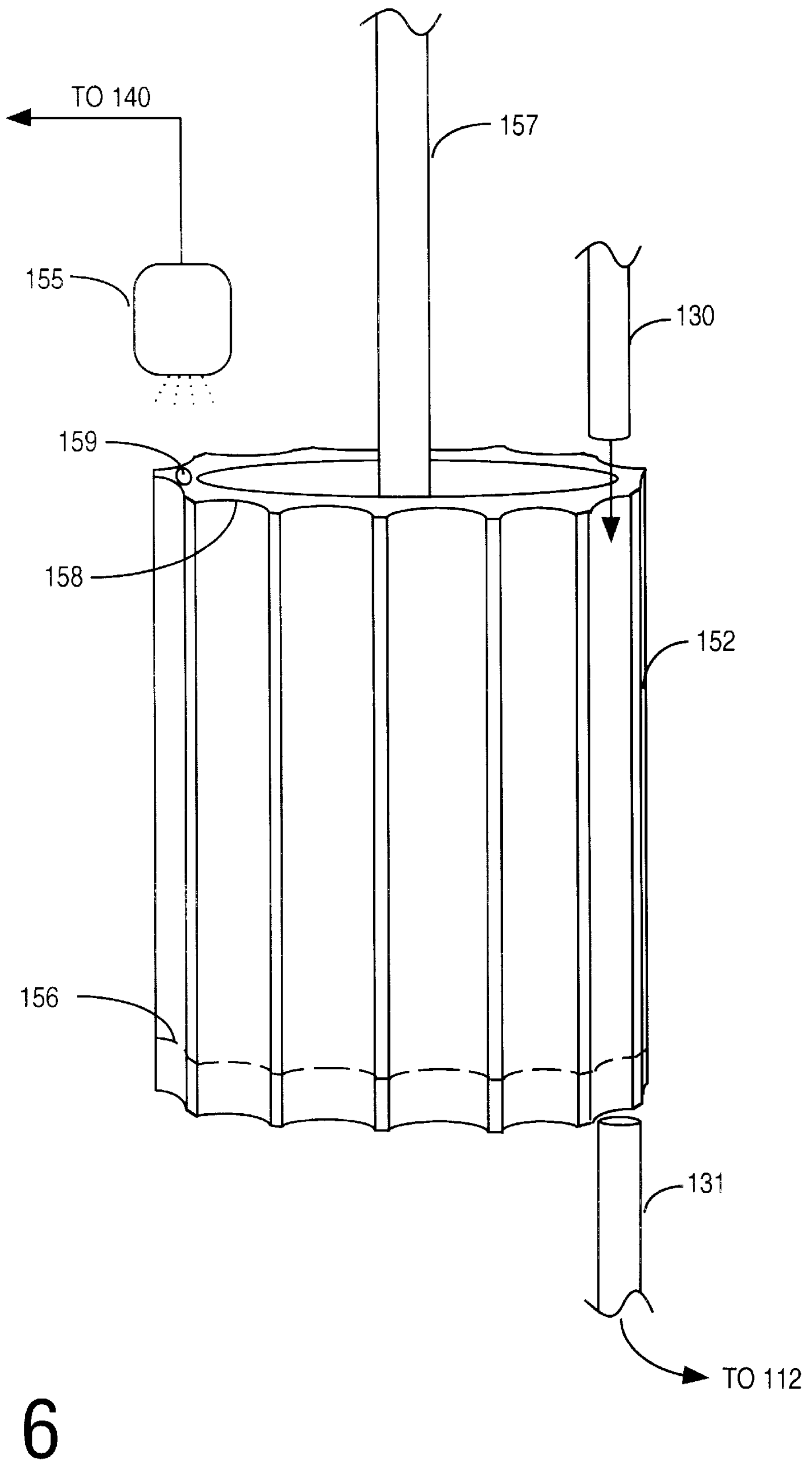
FIG. 6 is a diagram of a token reservoir according to one embodiment.

FIG. 6 is a diagram of an alternative reservoir 152 according to one embodiment. Alternative reservoir 152 in this embodiment, takes the place of token reservoir 134 of FIG. 1*b*. The use of alternative reservoir 152 allows particular tokens associated with a patron and a transaction to be segregated for later retrieval. This is useful, for example, in the case of a particular patron inserting counterfeit tokens into the machine. In this embodiment, all of the tokens inserted by a particular patron can be retrieved along with a photograph of the patron.

Referring to FIG. 6, alternative reservoir 152 includes token cylinders about its perimeter, such as example token cylinder 158. Token cylinder 158 is shown empty, but in operation holds tokens of various sizes. Tokens are retained in token cylinder 158 by retractable retaining lip 156. One of the token cylinders about the perimeter of alternative reservoir 152 is positioned below chute 130 at any given time. Acceptable tokens that are deposited by a patron during a transaction eventually fall into the token cylinder. For one embodiment using alternative reservoir 152, as tokens are identified in identification area 136, each acceptable token is counted by computer controller 140. When a maximum number of tokens have been deposited in a given token cylinder, spindle 157 and consequently, alternative reservoir 152 are rotated to place a different token cylinder under chute 130. The sensor and counting device indicate when alternative reservoir 152 is completely full by displaying a message on display 104. When alternative reservoir 152 is completely full, the automatic cashier machine will refuse further tokens, for example by closing a door to input bin 102. A patron wishing to continue must end the transaction, receive cash for the deposited tokens and then initiate a new transaction to complete the exchange of tokens for cash.

Alternative reservoir 152 includes cylinder identification marks corresponding to each token cylinder, such as identification mark 159. Identification mark 159, for one embodiment, is a bar code. Sensing device 155 for this embodiment is a bar code reading device . Sensing device 155 communicates with computer controller 140. Each identification mark identifies a token cylinder that is beneath chute 130 at the time the identification mark is read. The particular token cylinder is identified to computer controller 140 through sensing device 155. Computer controller 140 stores the identification of the cylinder and associates it with identification of a patron conducting a current transaction. For example, the photograph of the patron that is taken by CCTV 116 will be associated with the transaction by computer controller 140. At a later time tokens generated by a particular transaction with a particular patron can be retrieved through chute 131 and examined.

Alternative reservoir 152 is but one example of a mechanism used to segregate tokens involved in a particular transaction. Other types of mechanisms could be used in place of alternative reservoir 152.

For one embodiment of the automatic cashier machine, the machine could be located anywhere in the gambling establishment where patrons can gamble. For this embodiment, the machine is placed against a wall or against the back of another machine of the same or a different type and includes an access door at the side which is normally locked. Patrons use the machine to cash in tokens and casino personnel open the access door to replenish and empty or service the machine.

For another embodiment, the automatic cashier machine is placed parallel to human cashier windows such that patrons may access the front of the machine to cash in tokens and casino personnel may access the machine internally through an access door in the back of the machine inside the cashier area.

For yet another embodiment, the automatic cashier machine is located inside a cashier area of a casino and is not accessible to patrons at all. Cashiers use the machine to generate cash from patrons' tokens, thereby creating a record of each transaction and reducing employee fraud and error. For this embodiment, cashier personnel may be supplied with identification cards for accessing the machine, for example, cards with magnetic strips, or they may be supplied with identification codes to be entered into the machine so that the cashier can be associated with a transaction conducted by him or her.

Figure 7:
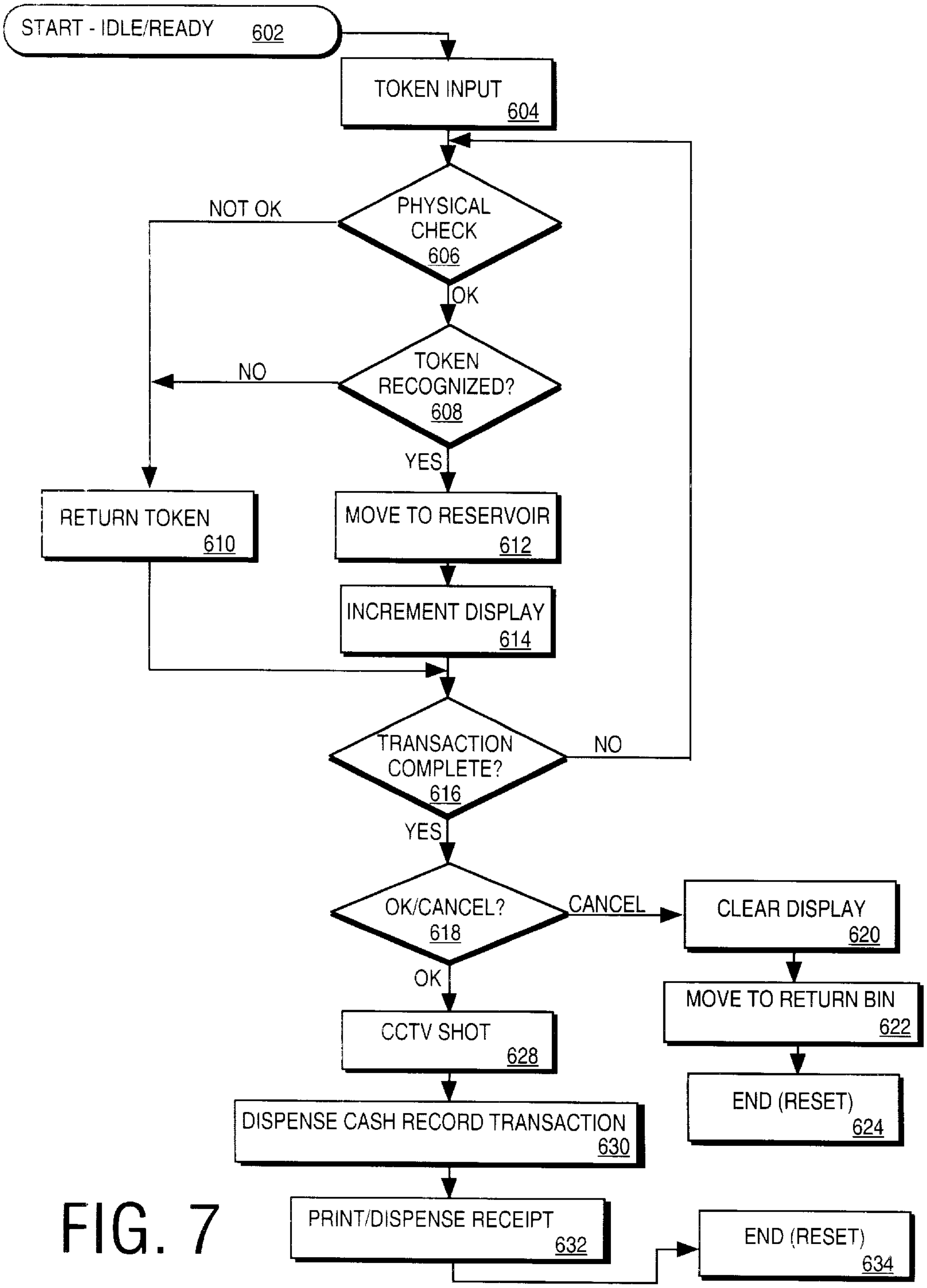
FIG. 7 is a flow diagram of the operation of one embodiment.

FIG. 7 is a flow diagram showing the method of the present invention according to the embodiment of FIG. 1*b*. At start 602, the automatic cashier machine is at an idle and ready state. For the automatic cashier machine to be at an idle and ready state the bill dispenser must have an adequate supply of bills, there must be space available to accommodate input tokens or gambling chips, and the machine must not be malfunctioning in any element.

At block 604 a user inputs tokens or chips into input bin 102. At physical check 606, the automatic cashier machine physically checks input items for acceptable size in first physical separator 120 and second physical separator 124. If the item size is acceptable, the token or chip is transmitted for identification to identification area 136 at block 608. If the item is not of an acceptable size it is returned to the user in return bin 112 at block 610. From block 610 the process proceeds to decision block 616 where it is determined whether there are any tokens or gambling chips left in the transaction.

Returning now to block 608, if the physical size is acceptable, the chip is then identified using one of the described methods. If the item is recognized it is moved to reservoir 134 at block 612. At block 614, the value of the item is added to the total transaction value displayed on display 104. Next, in block 616, it is determined whether there are any chips left in the transaction. At this point the user can insert another item causing the automatic cashier machine to return to block 606 for physical check of the item. At block 618, the user may press okay button 106 or cancel button 108. If the user presses cancel button 108, display 104 is cleared to display "$0.00" at block 620. Next, all items in the canceled transaction are returned to the user in return bin 112 at block 622, and finally the automatic cashier machine is reset and made ready for the next transaction at block 624.

If the user presses okay button 106 at block 618, then, at block 628, CCTV camera 116 takes a picture of the user for storage by computer controller 140. The picture of the user is associated with the transaction so that definitive transaction verification can later be made. At block 630, all bills associated with the transaction are output to the user through bill dispenser 110 and the transaction is recorded. At block 632 a printed receipt containing a complete record of the transaction is output to the user at receipt printer output 114. Finally, at block 634 the automatic cashier machine is reset and readied for the next transaction.

The present invention has been described in terms of particular embodiments, for example as an automatic cashier machine used by a patron of a gambling establishment who is identified with a transaction by a photograph. In other embodiments, patrons access the automatic cashier machine by means of a card containing identification and tracking information regarding the patron. In such embodiments a slot is provided for inserting the card to be read by the machine. The card contains, for example, information regarding the betting history of the player in the gambling establishment. The betting history from such cards is used to accrue "points" toward rewards or incentives, such as free drinks, meals, or hotel stays. It is desirable for a gambling establishment to obtains betting histories. Patrons can be motivated to use the automatic cashier machine with their card when they receive points for doing so.

Another advantage of having a patron use an automatic cashier machine is that, even when the patron uses an identification and tracking card, it may not be possible to obtain a very accurate indication of how many tokens are cashed in before the patron leaves and how many tokens the patron leaves the establishment with. For example, when the patron plays a card game involving a dealer, personnel at the card table must attempt to manually track the flow of money and tokens. This can be difficult to do accurately, in part because there is too much activity for personnel to monitor. Also, a patron may pocket a number of tokens so that they are not visible for counting. When the patron cashes in tokens using the machine with a card, an accurate record is made.

In the foregoing specification, the invention has been described with reference to specific exemplary embodiments thereof. It will, however, be evident that various modifications and changes may be made thereto, without departing from the broader spirit and scope of the invention as set forth in the appended claims. The specification and drawings are, accordingly, to be regarded in an illustrative rather than a restrictive sense.

What is claimed is:

1. An apparatus to receive tokens and dispense cash, comprising:

a separator device to separate items that are within a predetermined range of sizes from items that are not within a predetermined range of sizes;

a recognition device coupled to the separator device to receive the items that are within a predetermined range of sizes from the separator device, the recognition device to recognize a denomination of a token and a source of a token among the items that are within a predetermined range of sizes, wherein the token is not government-issued legal tender;

a controller device coupled to the recognition device, the controller device comprising a calculating device that calculates the monetary value of the token;

a dispensing device coupled to the recognition device that dispenses cash equal in value to the monetary value of the token; and a closed circuit television camera coupled to the controller device and positioned to record an image of a user during a transaction, to associate the image with the transaction, and to store the image of the user.

2. The apparatus of claim 1, further comprising:

an input bin that receives items; and a return bin coupled to the input bin and the separator device, the return bin to receive the items that are not within a predetermined range of sizes from the separator device.

3. The apparatus of claim 1, wherein the token comprises a radio frequency fiber that emits radiation of a particular frequency and wherein the recognition device comprises an transceiver that receives the particular frequency.

4. The apparatus of claim 1, wherein the controller device comprises a database of recognizable tokens and wherein the recognition device comprises a second closed circuit television (CCTV) camera that transmits an image of the token to the controller for comparison with the database.

5. The apparatus of claim 1, further comprising a display that displays a current transaction amount.

6. The apparatus of claim 1, further comprising a receipt mechanism coupled to the controller device that prints a report of the transaction and dispenses the report.

7. The apparatus of claim 1, wherein the token is a gambling chip.

8. An apparatus to receive tokens and dispense cash, comprising:

an input apparatus that receives acceptable tokens and items that are not acceptable tokens;

a separator device coupled to the input apparatus, the separator device to separate the acceptable tokens and the items that are not acceptable tokens according to a predetermined range of sizes;

a comparator coupled to the separator device comprising:

a token comparator that recognizes a source and a denomination of an acceptable token;

a transaction hold area that stores acceptable tokens associated with a single transaction until the transaction is complete;

a token reservoir coupled to the transaction hold area that stores acceptable tokens released from the transaction hold area; and a return bin coupled to the separator device and to the token comparator, the return bin to receive the items that are not acceptable tokens;

a bill dispenser coupled to the comparator;

a controller processor coupled to the comparator and to the bill dispenser, comprising:

control circuitry that controls operation of the comparator;

calculation circuitry that calculates transaction amounts, transaction amounts being totals of acceptable token values for a transaction expressed as an amount of legal currency;

a storage medium that stores data used in operating the controller processor and the bill dispenser, the data comprising programs executed by the controller processor; and a closed circuit television camera coupled to the controller processor and positioned to record an image of a user during a transaction, to associate the image with the transaction, and to store the image of the user.

9. The apparatus of claim 8, further comprising a receipt mechanism coupled to the controller processor that prints and dispenses a record of the transaction.

10. The apparatus of claim 8, wherein the token comparator comprises a second closed circuit television (CCTV) camera that transmits an image of an item to the controller processor and wherein the data stored on the storage medium further comprises a database comprising images of acceptable tokens.

11. The apparatus of claim 8, wherein the token comparator comprises a radio frequency (RF) transceiver that receives an encoded RF transmission of a token and transmits the RF transmission to the controller processor for comparison with a database of encoded RF transmissions.

12. The apparatus of claim 8, further comprising a user interface mechanism coupled to the controller processor, the user interface comprising:

a display device that communicates to the user the status of the transaction including a current, total transaction amount;

an approval input that transmits the user's approval of the transaction status to the controller processor; and a cancellation input that transmits the user's cancellation of the transaction to the controller processor.

13. A method to automatically exchange a user's item for a predetermined amount of money, comprising:

receiving an item inserted by a user during a transaction;

accepting the item if its size is within a predetermined range of sizes, otherwise, returning the item to the user;

identifying the item to determine if it is of a predetermined type;

retaining the item if it is of the predetermined type, otherwise, returning the item to the user;

identifying a monetary value of the item;

incrementing a transaction value by the monetary value;

displaying a current total transaction value;

taking a photograph of the user during the transaction;

associating the photograph with the transaction;

storing the photograph;

accepting approval of a completed transaction from the user and dispensing money having the current total transaction value; and accepting cancellation of the completed transaction from the user and returning items inserted by the user during the transaction.

14. The method of claim 13, further comprising dispensing a printed transaction record when the transaction is complete.

15. The method of claim 13, wherein identifying the item to determine if it is of the predetermined type comprises identifying a source of the item and determining the item as of the predetermined type if it has a predetermined source.

16. The method of claim 15, further comprising recognizing a radio frequency (RF) transmission of the item to determine the source of the item and the monetary value of the item.

17. The method of claim 15, further comprising comparing a closed circuit television (CCTV) image of the item to a database of images of items of the predetermined type to determine the source of the item and the monetary value of the item.

18. The method of claim 13, wherein the item of the predetermined type is a gambling chip having a predetermined source.

19. The method of claim 18, wherein the predetermined source is a particular gambling establishment.

20. An apparatus to receive a token and dispense an amount of money, comprising:

an input device configured to receive a token input by a user;

a separator device coupled to the input device and configured only to accept the token if the token is within a predetermined range of sizes, the separator device to return the token to a return bin if the token is not within a predetermined range of sizes;

an identification device configured to generate an identification of the user during a transaction;

a recognition device configured to recognize the token that are accepted by the separator device;

a reservoir configured to collect tokens that are input to the apparatus and accepted by the separator device; and a computer controller configured to control operation of the apparatus, to store information regarding the transaction, and to associate the transaction with the identification of the user;

the identification device including a closed circuit television camera coupled to the computer controller and positioned to record an image of the user during the transaction, to associate the image with the transaction, and to store the image of the user.

21. The apparatus of claim 20, wherein the identification device comprises a card reading device configured to read a user card.

22. The apparatus of claim 21, wherein the reservoir is further configured to segregate a group of tokens input by the user during the transaction.

23. The apparatus of claim 22, further comprising a return mechanism configured to return the segregated group of tokens, wherein the segregated group of tokens is associated with the transaction and with the identification of the user.

24. An apparatus to receive tokens and dispense cash, comprising:

an image comparator to compare an image of a token with a database to recognize a denomination of the token and a source of the token, wherein the token is not government-issued legal tender;

a controller device coupled to the image comparator, the controller device comprising a calculating device that calculates the monetary value of the token; and a dispensing device coupled to the image comparator that dispenses cash equal in value to the monetary value of the token.

25. The apparatus of claim 24, further comprising:

an input bin that receives items;

a return bin coupled to the input bin; and a separator device coupled to the return bin and to the image comparator that directs items that are not within a predetermined range of sizes to the return bin and directs items that are within a predetermined range of sizes to the image comparator.

26. The apparatus of claim 24, wherein the controller device comprises a database of recognizable tokens and wherein the image comparator comprises a closed circuit television (CCTV) camera that transmits the image of the token to the controller for comparison with the database.

27. The apparatus of claim 24, further comprising a display that displays a current transaction amount.

28. The apparatus of claim 24, further comprising a receipt mechanism coupled to the controller device that prints a report of a transaction and dispenses the report.

29. The apparatus of claim 24, further comprising a CCTV camera coupled to the controller device and positioned to record a film of a user during a transaction.

30. The apparatus of claim 24, wherein the token is a gambling chip.

31. An apparatus to receive tokens and dispense cash, comprising:

an input apparatus that receives acceptable tokens and items that are not acceptable tokens;

a comparator coupled to the input apparatus comprising:

an image comparator to compare an image of an acceptable token with a database to recognize a source and a denomination of the acceptable token;

a transaction hold area that stores acceptable tokens associated with a single transaction until the transaction is complete;

a token reservoir coupled to the transaction hold area that stores acceptable tokens released from the transaction hold area; and a return bin coupled to the input apparatus and to the image comparator that receives the items that are not acceptable tokens;

a bill dispenser coupled to the comparator; and a controller processor coupled to the comparator and to the bill dispenser, comprising:

control circuitry that controls operation of the comparator;

calculation circuitry that calculates transaction amounts, transaction amounts being totals of acceptable token values for a transaction expressed as an amount of legal currency; and a storage medium that stores data used in operating the controller processor and the bill dispenser, the data comprising programs executed by the controller processor.

32. The apparatus of claim 31, further comprising a receipt mechanism coupled to the controller processor that prints and dispenses a record of a transaction.

33. The apparatus of claim 31, wherein the image comparator comprises a closed circuit television (CCTV) camera that transmits the image of an item to the controller processor and wherein the data stored on the storage medium further comprises a database comprising images of acceptable tokens.

34. The apparatus of claim 31, further comprising a user interface mechanism coupled to the controller processor, the user interface comprising:

a display device that communicates to a user the status of a transaction including a current, total transaction amount;

an approval input that transmits the user's approval of the transaction status to the controller processor; and a cancellation input that transmits the user's cancellation of the transaction to the controller processor.

35. A method to automatically exchange a user's item for a predetermined amount of money, comprising:

receiving an item inserted by a user during a transaction;

comparing an image of the item with a database to identify the item and to determine if it is of a predetermined type;

retaining the item if it is of the predetermined type, otherwise, returning the item to the user;

identifying a monetary value of the item;

incrementing a transaction value by the monetary value;

displaying a current total transaction value;

accepting approval of a completed transaction from the user and dispensing money having the current total transaction value; and accepting cancellation of the completed transaction from the user and returning items inserted by the user during the transaction.

36. The method of claim 35, further comprising dispensing a printed transaction record when the transaction is complete.

37. The method of claim 35, wherein the comparing an image of the item with a database includes comparing a closed circuit television (CCTV) image of the item to a database of images of items of the predetermined type to determine the source of the item and the monetary value of the item.

38. The method of claim 35, wherein the item of the predetermined type is a gambling chip of a predetermined source.

39. The method of claim 38, wherein the predetermined source is a particular gambling establishment.

40. The method of claim 35, further comprising:

taking a photograph of the user during the transaction;

associating the photograph with the transaction; and storing the photograph.

41. An apparatus to receive a token and dispense an amount of money equal to the monetary value of the token, comprising:

an input device configured to receive a token input by a user;

an identification device configured to generate an identification of the user during a transaction;

an image comparator to compare an image of the token with a database and to recognize the token;

a reservoir configured to collect tokens that are input to the apparatus; and a computer controller configured to control operation of the apparatus, to store information regarding the transaction, and to associate the transaction with the identification of the user.

42. The apparatus of claim 41, wherein the identification device comprises a closed circuit television (CCTV) camera.

43. The apparatus of claim 41, wherein the identification device comprises a card reading device configured to read a user card.

44. The apparatus of claim 43, wherein the reservoir is further configured to segregate a group of tokens input by the user during the transaction.

45. The apparatus of claim 44, further comprising a return mechanism configured to return the segregated group of tokens, wherein the segregated group of tokens is associated with the transaction and with the identification of the user.

46. The apparatus of claim 41, wherein the image comparator comprises a closed circuit television (CCTV) camera that transmits the image of an item to the controller processor and wherein the data stored on the storage medium further comprises a database comprising images of acceptable tokens.

* * * * *